(12) United States Patent
Gerstenberger

(10) Patent No.: US 6,289,917 B1
(45) Date of Patent: Sep. 18, 2001

(54) PROPORTIONAL FLOW DIVIDER VALVE

(76) Inventor: Gerald Ross Gerstenberger, 3812 1st Ave., W., Bradenton, FL (US) 34205

( * ) Notice: Subject to any disclaimer, the term of this patent is extended or adjusted under 35 U.S.C. 154(b) by 0 days.

(21) Appl. No.: 09/343,240

(22) Filed: Jun. 30, 1999

(51) Int. Cl.$^7$ .................................................. G05D 11/03
(52) U.S. Cl. ............................ 137/101; 137/269; 91/515
(58) Field of Search .................................. 137/101, 269; 91/515

(56) References Cited

U.S. PATENT DOCUMENTS

| | | | |
|---|---|---|---|
| 2,242,002 | 5/1941 | Klein | 137/101 |
| 4,121,601 | 10/1978 | Presley . | |
| 4,261,381 | 4/1981 | Geiling | 137/101 |
| 4,465,089 | * 8/1984 | Inhofer | 137/101 |

* cited by examiner

*Primary Examiner*—Stephen M. Hepperle
(74) *Attorney, Agent, or Firm*—Millen, White, Zelano & Branigan, P.C.

(57) ABSTRACT

A proportional flow divider valve is configured only as a controlled flow valve by using a first spool in a valve body or as both a free flow valve as well as control flow valve by using a second spool in the valve body. The second spool is provided with a return fluid check valve which is integral therewith and disables the control flow mode when pressure is applied to a piston surface on the return flow check valve. The return flow check valve is configured as a split sleeve which fits around a lateral inlet passage through the second spool and is urged to close the lateral inlet passage under pressure from returning hydraulic fluid. Normally, the split sleeve is axially biased by a vented coil spring to open the lateral inlet passage in the spool. When the lateral inlet passage is closed, it blocks the return of hydraulic fluid entering work ports in the valve body from flowing through metered end arrangements of the spool and allows the fluid to flow into a central annular chamber disposed around the spool and then out of an inlet port in the valve body.

14 Claims, 3 Drawing Sheets

PROPORTIONAL FLOW DIVIDER VALVE

FIELD OF THE INVENTION

The present invention is directed to a proportional flow divider valve. More particularly, the present invention is directed to a proportional flow divider valve used in control flow and free flow operational modes.

BACKGROUND OF THE INVENTION

Flow divider valves are used in hydraulics systems, such as hydraulic systems for lifting dump truck beds. With a dump truck bed accurate regulation of hydraulic fluid flow to hydraulic cylinders is necessary as the bed is raised with a heavy load, and is frequently not necessary when the load has been dumped and the bed is returning to its down position. Highly restrictive, relatively small, metering openings through which hydraulic fluid flows to lift the bed may unduly slow lowering of the bed. Consequently, it is desirable to by-pass the restrictive openings. In the past, this has been done with a separate return valve which of course increases expense and manufacturing time, as well as increasing parts inventory.

Proportional flow divider valves have been developed with check valve capability built into the valve body of the proportional flow divider valve; however, a valve body having both capabilities cannot be used for situations where it is only desirable to have the proportional flow divider feature without a free flow capability. Consequently, when stocking valves with both control flow and free flow capabilities, two types of valve bodies need to be stocked.

SUMMARY OF THE INVENTION

It is an object of the present invention to provide a proportional flow divider valve having a valve body which can be used as a flow divider valve only or as a flow divider valve with a return check valve to permit free flow of returning fluid through the valve body.

In view of this feature and other features, the present invention is directed to a proportional flow divider valve comprising a valve body having an inlet port and a plurality of work ports, wherein the inlet port is adapted for connection to a source of pressurized fluid and the work ports are adapted to connect to a hydraulic working device. The valve body includes a flow divider therein for dividing fluid flow entering the valve body through the inlet port into a plurality of controlled flows, each of which exit the valve body through a separate work port to power the working device. A return check valve, integral with the flow divider, blocks flow of fluid through the flow divider as fluid returns through the work ports into the valve body and out of the inlet port.

In a more specific aspect, the flow divider is configured as a spool within the valve body, the spool having a lateral inlet passage and a pair of opposed axially extending outlet passages in communication with the inlet passage. The return check valve does not block the inlet passage when fluid is flowing into the inlet port and blocks the inlet passage when fluid is flowing into the work ports.

In a more specific aspect, the return check valve is configured as a sleeve assembly biased by a spring to normally keep the inlet passage through the spool open when the valve is in a controlled flow mode, the bias of the spring being overcome by fluid pressure against the sleeve assembly exerted by fluid returning from the work ports when the valve is in a free flow mode.

DETAILED DESCRIPTION

Figure 1:
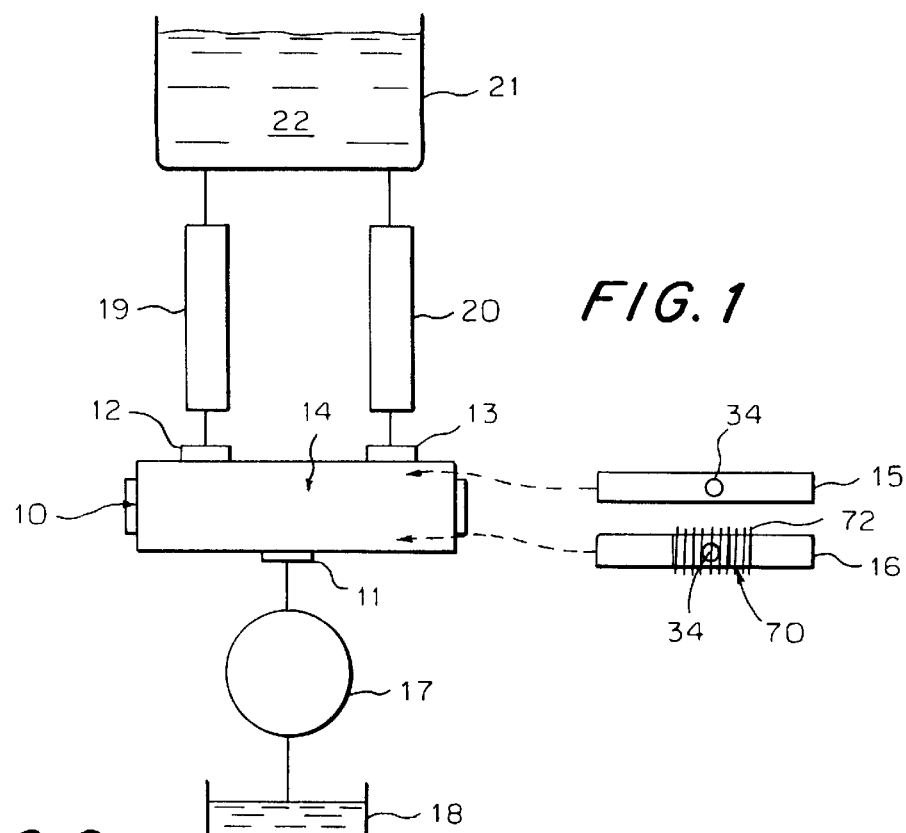
FIG. 1 is a schematic, not to scale, diagram illustrating a system utilizing a proportional flow divider valve in accordance with the present invention.

Referring now to FIG. 1, there is shown a schematic proportional flow divider valve 10 having an inlet port 11 and a pair of work ports 12 and 13. According to the present invention, the proportional flow divider valve 10 includes a valve body 14 which may have therein either a controlled flow spool 15 or a spool 16 which has both controlled flow and free flow. Depending on the application, either the spool 15 or the spool 16 may be used within the same housing 14. The spools 15 and 16 can move axially within the valve body 14 to balance the flow of hydraulic fluid out of the work ports 12 and 13.

Connected to the inlet port 18 is a source of pressurized hydraulic fluid such as a pump 17 that draws hydraulic fluid from tank 18. The work ports 12 and 13 are connected to a hydraulic working device which may, for example, be a pair of hydraulic cylinders 19 and 20 which may, for example, be used to move a mass such as a dump truck bed 21 having a load 22 therein. While a dump truck bed 21 operated by hydraulic cylinders 19 and 20 is exemplary, the proportional flow divider valve 10 may be used with any application which relies on flow divider valve for its operation, such as a bulldozer blade or any other arrangement. According to the present invention, the controlled flow spool 15 is used if return flow back through the flow divider valve 10 is not hindered by the slow return of fluid or if the slow return of fluid is part of the functioning of the system, whereas the flow divider valve 16 is used in situations where control flow is desirable when pressurizing the hydraulic working device for hydraulic working devices and free flow is desired when hydraulic fluid is returned to tank 18.

Figure 2:
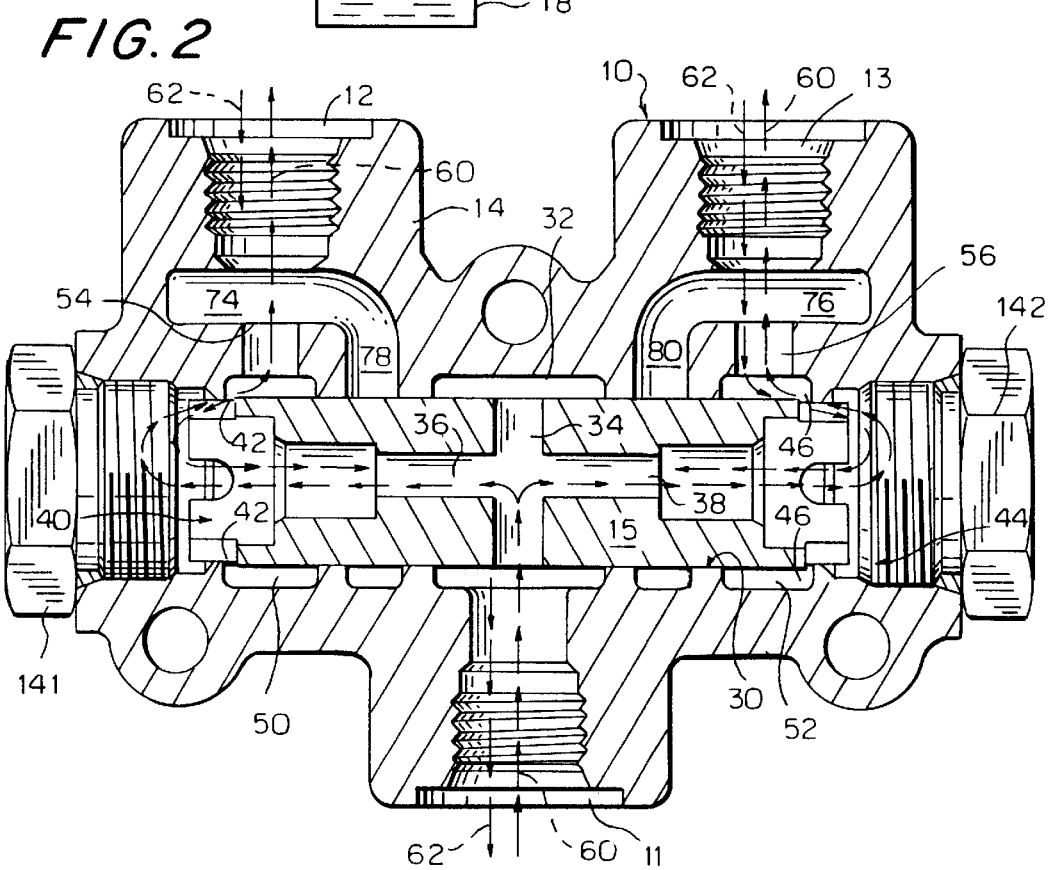
FIG. 2 is a side elevation of a proportional flow, divider valve in accordance with the present invention which has only a controlled flow mode.

Referring now to FIG. 2, where the proportional flow divider valve 10 is shown in detail with the control flow spool 15 mounted therein, it is seen that the valve body 14 has a through bore 30 which receives the control flow spool 15. The spool 15 can shift axially with the bore 30 to balance output through the work ports 12 and 13. The inlet port 11 communicates with an annular center chamber 32 which surrounds a central portion of the control flow spool 15. Control flow spool 15 has a lateral inlet passage 34 and a pair of axially extending outlet passages 36 and 38. The outlet passage 36 communicates with a metering arrangement 40 which has metering gaps 42 adjacent the end of the spool 15 while the outlet passage 38 communicates with a metering arrangement 44 that has metering gaps 46. The metering gaps 42 are in communication with a first end annular chamber 50 while the metering gaps 46 are in communication with a second end annular chamber 52. The end annular chamber 50 and 52 communicate with passageways 54 and 56, respectively, that are connected to work ports 12 and 13, respectively to form a fluid power path for pressurized hydraulic fluid flowing from the pump 17.

When the proportional flow divider valve 10 is operating in the controlled flow pressure mode, pressurized hydraulic fluid from the pump 17 enters the inlet port 1 1 and flows into the center annular chamber 32. The fluid then passes through the lateral inlet passage 34 in the spool 15 and out through the axial passages 36 and 38 thereof. The fluid is then metered by metering gaps 42 and 46 so as to control the rate of flow through the fluid power path to the work ports 12 and 13. Pressurized hydraulic fluid is identified by the solid arrows 60 which how the path of pressurized fluid. When hydraulic fluid is returned, the path is reversed and follows the dotted arrows 62 that parallel the path defined by the solid arrows 60 so that the return fluid is also metered through the metering gaps 42 for returning through the axially extending passages 36 and 38 in the spool 15 into the laterally extending passage 34 and out through the inlet port 11. It is seen that the arrangement using the control flow spool 15 has a relatively slow return to tank 18 of hydraulic fluid from a working device, such as that provided by hydraulic cylinders 19 and 20 (see FIG. 1).

Referring now to FIGS. 3 through 7 where the proportional flow divider valve 10 is again shown in detail using the same valve body 14, the only change is the replacing of spool 15 with the spool 16. The spool 16 is configured differently in that it has a return check valve assembly 70 integral therewith for selectively closing the lateral inlet passage 34' through the valve spool 16. The return check valve 70 is normally biased open by a coil spring 72 so that the lateral inlet passage 34' is normally open. Accordingly, the controlled flow of pressurized fluid 60' follows a path identical to the controlled flow of fluid 60 shown in FIG. 2.

Figure 3:
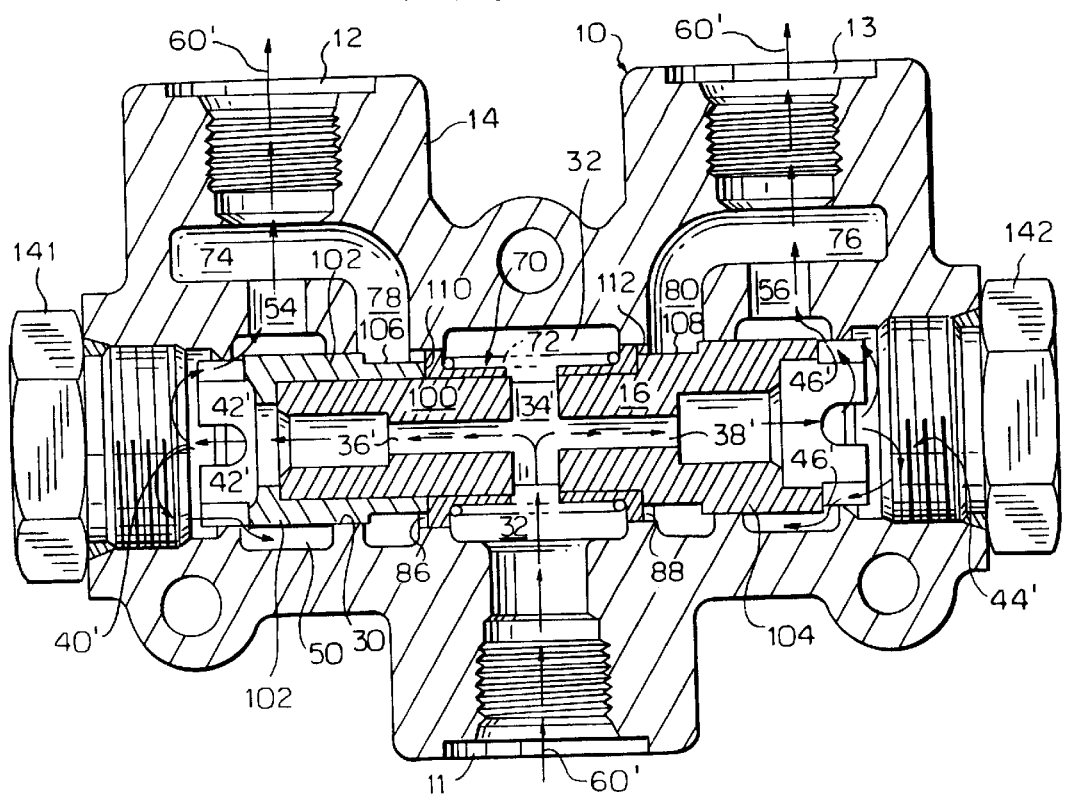
FIG. 3 is an elevation of the proportional flow divider valve in accordance with the present invention operating in a controlled flow mode, but having the capability to operate in a free flow mode.
Figure 4:
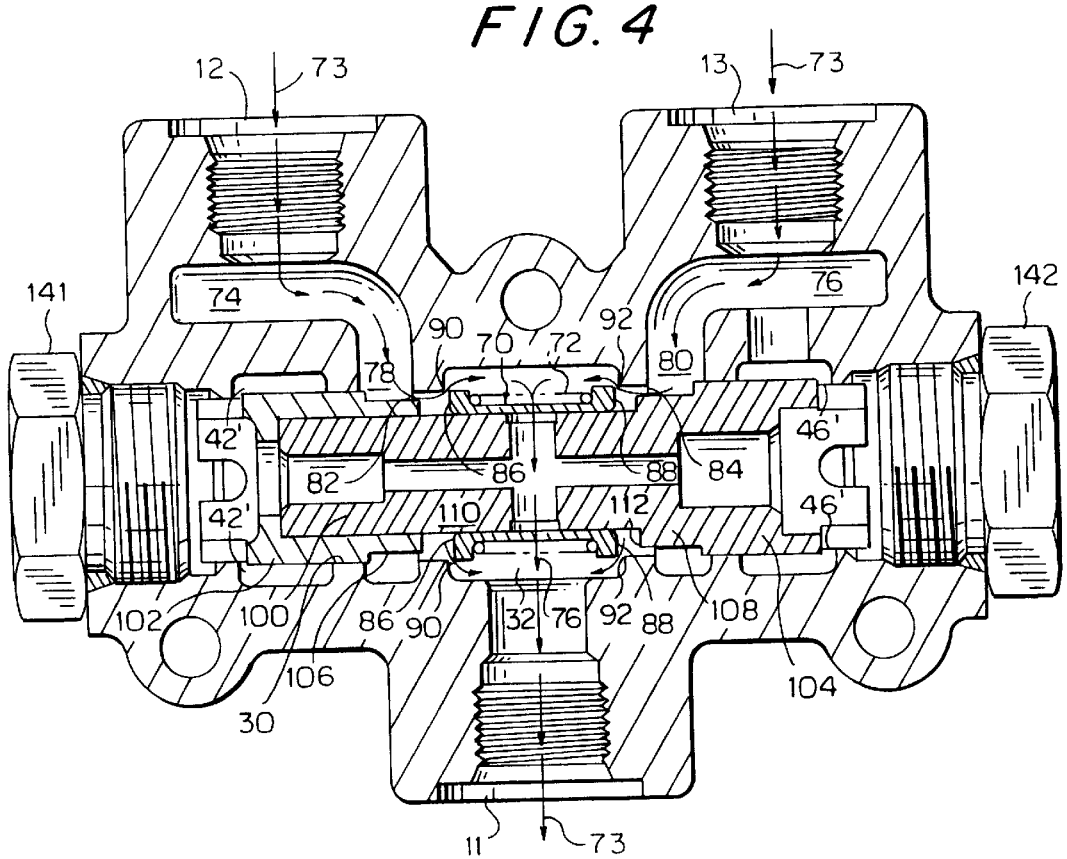
FIG. 4 is a side elevation of the proportional flow divider valve of FIG. 3 showing the valve operating in a free flow mode.

Referring now more specifically to FIG. 4, where the free flow mode occurs, it is seen that the return hydraulic fluid 73 flowing back through the work ports 12 and 13 enters return chambers 74 and 76 which are connected by return passages 78 and 80, respectively, to annular gaps 82 and 84, respectively. The return hydraulic fluid 73 applies pressure to end faces 86 and 88 of the check valve assembly 70 so as to compress the coil spring 72, thus shifting the return check valve assembly from the control flow mode of FIG. 3 to the free flow mode of FIG. 4 so that the hydraulic fluid flows through gaps 90 and 92 and into the central annular chamber 32. The central annular chamber 32 surrounds the spool 16 so that the return hydraulic fluid 73 flows around the spool 16 and out through the inlet port 11 as is seen in FIG. 4 because the inlet passage 34' is blocked. When the return pressure against end faces 86 and 88 of the return check valve assembly 70 is less than the pressure exerted by coil spring 72 of the return check valve assembly 70, the coil spring biases the return check valve assembly back to the mode of FIG. 3 so that the lateral inlet passage 34' is open and ready for another controlled flow of pressurized fluid.

The force exerted by the coil spring 72 offers less resistance to flow than flow through the metering gaps 42' and 46' so that return fluid flows through the gaps 90 and 92 instead. This is because once the check valve assembly 70 closes, returning hydraulic fluid is blocked from exiting via the inlet passage 34' in the spool to the central annular chamber 32. Thus, only fluid 73 flowing around the spool 16 in the central annular chamber 32 can exit through the inlet port 11.

A situation in which the spool 16 is used instead of the spool 15 is exemplified by the dump truck arrangement of FIG. 1 in which the dump truck bed 21 is lifted relatively slowly to discharge the load 22, but need not be returned to its down position slowly when empty. If the valve 10 of FIGS. 3 and 4 shifted to the free flow mode of FIG. 4, then the weight of the truck bed 21 alone is enough to supply pressure to the return fluid so that the return fluid closes the check valve assembly 70. This allows the hydraulic fluid 73 to by-pass the metering gaps 42' and 46'. Again, while a truck bed is used as an example in FIG. 1, the truck bed is used for illustrative purposes only and the hydraulic working device can be other types of hydraulically moved loads.

As seen in FIGS. 3 and 4, the spool 16 is an assembly having a cylindrical core 100 that has end portions 102 and 104 which have the metering arrangement 40' and 44' at the ends thereof so as to define gaps 42' and 46' with the bore 30 of valve body 14. The end portions 102 and 104 have reduced diameter portions 106 and 108 with shoulders 110 and 112. In the controlled flow mode of FIG. 3, the shoulders 110 and 112 are abutted by the end faces 86 and 88 of the annular sleeve assembly 70 under the bias of the coil spring 72. The gaps 82 and 84 are the result of the reduced diameter portions 106 and 108 of the end portions 102 and 104 not extending all the way to the surface of the bore 30 of valve body 14 so that fluid pressure from the returning hydraulic fluid 73 can be applied against the end surfaces 86 and 88 of the check valve assembly 70, the end surfaces 86 and 88 functioning as piston faces.

Figure 5:
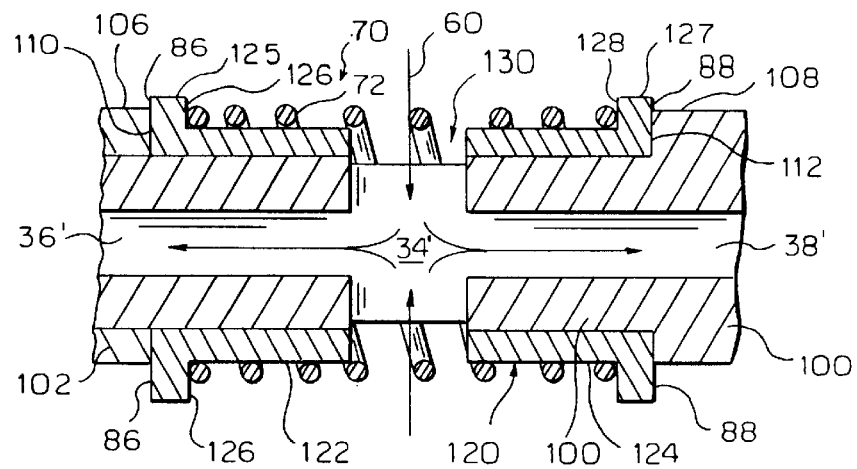
FIG. 5 is a side view of the valve of FIG. 3 showing a return check valve positioned for use during the controlled flow mode.

As is seen in FIG. 5, the return check valve assembly 70 is comprised of a split sleeve 120 having a first sleeve member 122 and a second sleeve member 124. The first sleeve member has a lip 125 with a shoulder 126 which faces an opposite lip 127 with a shoulder 128 on the second sleeve member 124 so that the coil spring 72 which is nested between the first and second sleeve members urges the sleeve members apart to define a gap 130 through which hydraulic fluid can pass into the inlet passage 34' of the spool 16 (see FIG. 3).

Figure 6:
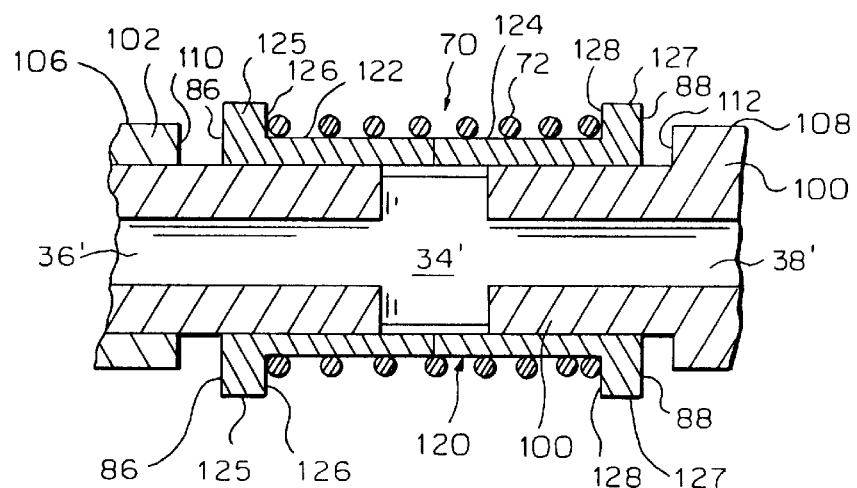
FIG. 6 is a view similar to FIG. 5 but showing the position of the return check valve when the proportional flow divider valve is operating in the free flow mode of FIG. 4.

Referring now to FIG. 6 in combination with FIG. 5, it is seen that the gap 130 in the split sleeve assembly 120 closes when pressure is placed on end surfaces 86 and 88 of the split sleeve members 122 and 124 by hydraulic fluid bearing against the surfaces 86 and 88. This pressure both opens the gaps 90 and 92 and closes the inlet passage 34' thereby allowing free flow of hydraulic fluid 73 back through the valve body 14 to tank 18.

Figure 7:
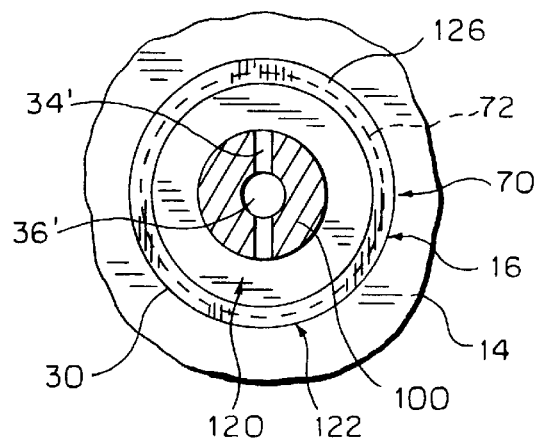
FIG. 7 is a section taken along line 7 of FIGS. 5 and 6.

As is seen in FIG. 7, the split sleeve assembly 120 comprising the return check valve 70 fits within the central bore 30 of the valve body 14 since the diameter of the spool 16 with the split sleeve assembly is the same as the diameter of the spool 15 without the split sleeve assembly. Since the controlled flow spool 15 and the controlled flow and free flow spool 16 both fit in the bore 30 of the valve body 14, the spools are interchangeable. Therefore, it is only necessary to store one valve body configuration 14. By simply removing end plugs 141 and 142 and inserting the desired spool 15 or 16, a selected application of the proportional flow divider spool 10 is provided. In other words, the combination of the valve body 14 and the spools 15 and 16 provides an arrangement in kit form.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

What is claimed is:

1. A proportional flow divider valve arrangement, comprising:
   a valve body having an inlet port adapted to connect to a source of pressurized hydraulic fluid and a plurality of work ports adapted to connect to a hydraulic working device; the valve body including a return free flow path therethrough from the work ports to the inlet port;
   a flow divider within the valve body for dividing fluid flow entering the body through the inlet port into a plurality of controlled flows through metered openings, wherein each flow exits the valve body through a separate work port to power the working device;
   a return check valve carried by the flow divider for blocking flow of fluid through the flow divider and thus through the metered openings and allowing flow through the free flow path when fluid returns through the work ports into the valve body and out of the inlet port.

2. The proportional flow divider valve arrangement of claim 1 in kit form further including an additional flow divider without a return check valve integral therewith which additional flow divider is interchangeable with the flow divider of claim 1.

3. The proportional flow divider valve arrangement of claim 2 in kit form wherein the flow divider with the return check valve integral therewith and the additional flow divider are both configured as spools.

4. The proportional flow divider valve arrangement of claim 1 wherein the flow divider is configured as a spool within the valve body, the spool having a lateral inlet passage and a pair of opposed axially extending outlet passages in communication with the inlet passage, the inlet passage being in communication with the inlet port, wherein the return check valve does not block the inlet passage when fluid is flowing into the inlet port and blocks the inlet passage when fluid is returning through the work ports into the valve body and out of the inlet port.

5. The proportional flow divider valve arrangement of claim 4 wherein the return check valve is configured as a sleeve assembly disposed around the spool and normally urged to uncover the passage; the sleeve assembly blocking the lateral inlet passage upon fluid flowing back into the valve body through the work ports to uncover the lateral inlet passage and allow the fluid to flow out of the inlet port.

6. The proportional flow divider valve arrangement of claim 5 wherein there are two work ports each work port being connected by a power path from the outlet passage in the spool through the metered openings to the work port to provide controlled flow and a return path from the work port to the outlet by passing the metered openings, the check valve being in the return path to close the lateral inlet passage in the spool and thus bypass the metered openings as fluid flows back through the work ports into the valve body and toward the inlet port.

7. The proportional flow control valve arrangement of claim 6 wherein the sleeve assembly is biased to close the inlet passage in the spool by a spring.

8. The proportional flow control valve arrangement of claim 7 wherein the sleeve assembly comprises a pair of sleeves with the spring disposed therearound and engaging the sleeves to urge the sleeves apart to uncover the inlet passage.

9. The proportional control valve arrangement of claim 8 wherein the sleeves each have a radial shoulder thereon which on one side provides an abutment for the spring and on the other side provides a piston surface disposed in the return path which closes the inlet passage upon being pressurized by fluid returning through the work ports.

10. A proportional flow divider comprising:
    a valve body with an inlet port for connection to a source of pressurized fluid and a pair of work ports adapted for connection to a hydraulic working device;
    a spool in the valve body between the inlet port and pair of work ports, the spool having a laterally extending inlet passage and an axially extending outlet passage to divide the flow of fluid into two pressure streams; the spool having portions creating metered openings through which the pressurized fluid flows to the work ports;
    power paths in the valve body connecting the inlet passage at one end to one work port and at the other end to the other work port;
    return paths in the valve body for connecting the works to the outlet port;
    a check valve assembly in the return paths, the check valve assembly having a first mode in which it does not block flow through the lateral inlet passage and a second mode in which it blocks fluid flow into and through the lateral inlet passage;
    a spring urging the check valve to the first mode,
    a piston surface on the check valve and in the return path for being pressured by return fluid to move the check valve from the first mode to the second mode to cover the inlet passage, and
    a by-pass chamber within the return flow path and adjacent the spool, the by-pass chamber being connected to the inlet port.

11. The proportional flow divider valve of claim 10 wherein the check valve is a sleeve assembly positioned around the spool and covering the inlet passage when in the first mode and uncovering the inlet passage when in the second mode.

12. The proportional flow divider valve of claim 11 wherein the sleeve assembly comprises a pair of sleeves mounted on the spool, the sleeves each having an end flange with a first surface facing a first surface of the other sleeve and a second surface facing away from the other sleeve; the first surfaces being abutted by the spring and the second shoulders forming piston faces interfacing with the return path.

13. The proportional flow divider of claim 12 wherein the spring is a coil spring.

14. A proportional flow divider comprising:
    a valve body with an inlet port for connection to a source of pressurized fluid and a pair of work ports adapted for connection to a hydraulic working device;
    a spool in the valve body between the inlet port and pair of work ports, the spool having a laterally extending inlet passage and an axially extending outlet passage to divide the flow of fluid into two pressure streams; the spool having portions creating metered openings through which the pressurized fluid flows to the work ports;

power paths in the valve body connecting the inlet passage at one end to one work port and at the other end to the other work port;

return paths in the valve body for connecting the works to the outlet port;

a check valve assembly in the return paths, the check valve assembly having a first mode in which it does not block flow through the lateral inlet passage and a second mode in which it blocks fluid flow through the lateral inlet passage;

a spring urging the check valve to the first mode, a piston surface on the check valve and in the return path for being pressured by return fluid to move the check valve from the first mode to the second mode to cover the inlet passage, and a by-pass chamber within the return flow path and adjacent the spool, the by-pass chamber being connected to the inlet port.

* * * * *